2 Sheets—Sheet 2.
M. H. HILL.
CUPBOARD.
No. 184,007. Patented Nov. 7, 1876.
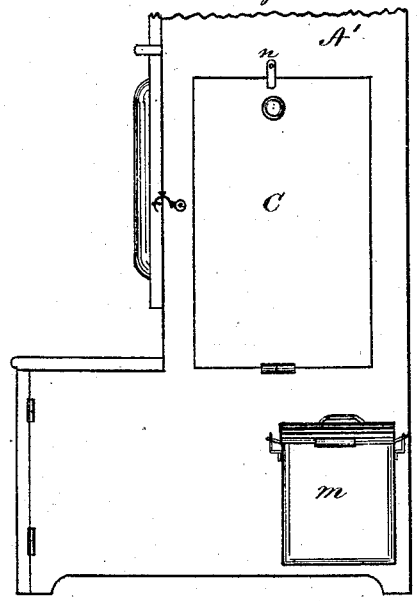
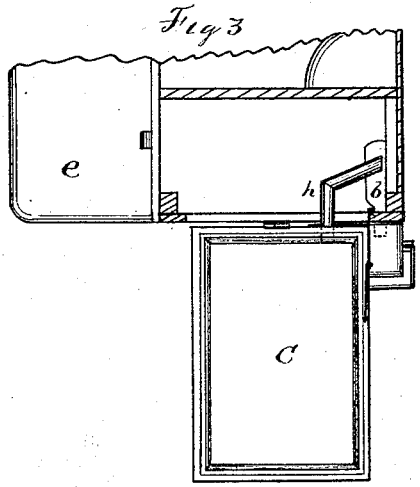
Witnesses
David G. Weems.
Willis H. Moxon
Inventor
Milton H. Hill
per Atty
A. H. Evans & Co.
Washington D.C.

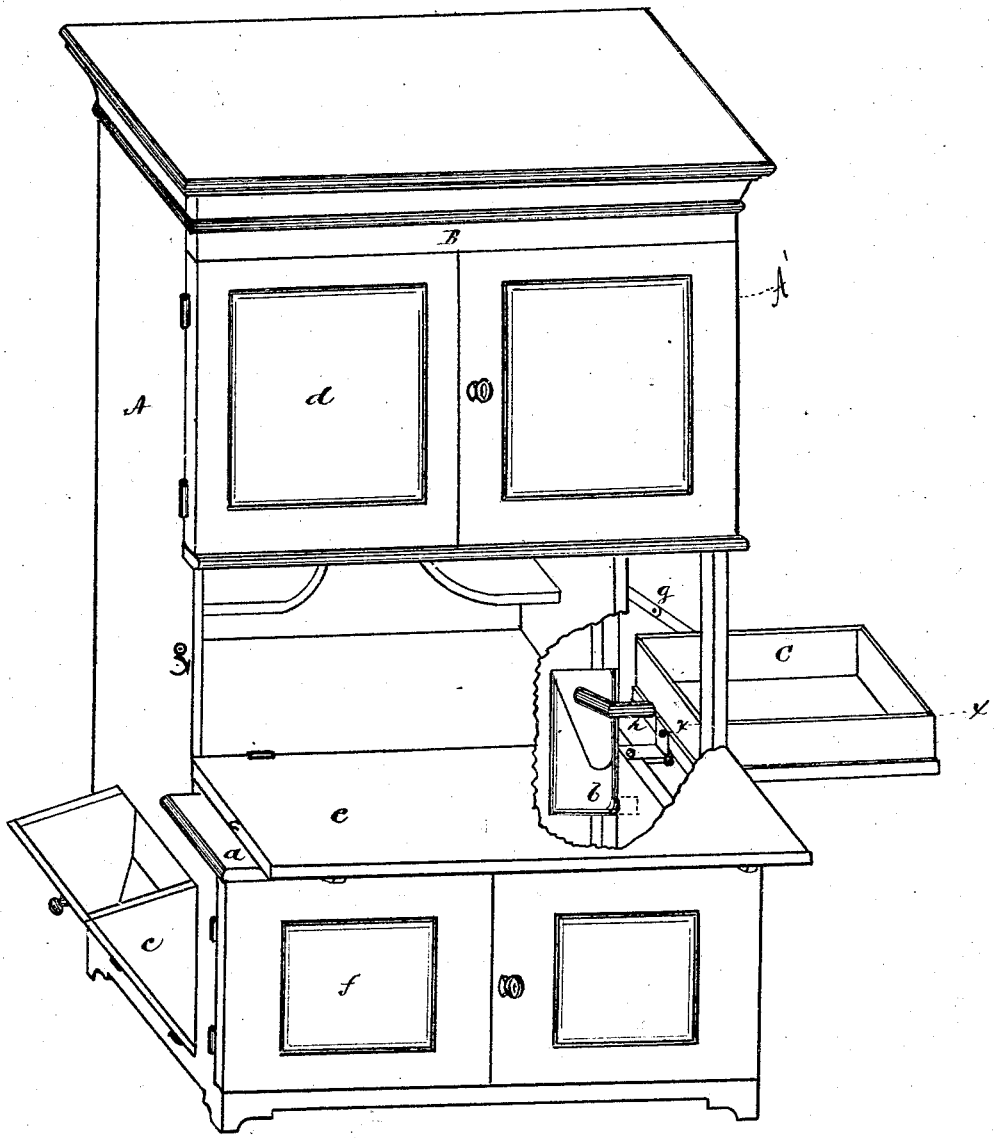

UNITED STATES PATENT OFFICE.

MILTON H. HILL, OF WINTERSET, IOWA.

IMPROVEMENT IN CUPBOARDS.

Specification forming part of Letters Patent No. 184,007, dated November 7, 1876; application filed April 25, 1876.

*To all whom it may concern:*

Be it known that I, MILTON H. HILL, of Winterset, Iowa, have invented certain new and useful Improvements in Cupboards, of which the following is a full, clear, and exact description, reference being had to the accompanying drawings, making a part of this specification, in which—

Figure 1 is a perspective view of my invention. Fig. 2 is a view of a portion of one end. Fig. 3 is a horizontal cross-section on the line $x\ x$ of Fig. 1.

The object of my invention is to provide a cheap, useful, and compact cupboard for kitchen use, comprising a sink, flour-chest, table, &c.; and it consists in the combination and arrangement of parts hereinafter described and claimed.

To enable others skilled in the art to make and use my invention, I will proceed to describe the exact manner in which I have carried it out.

In the said drawings, A A' represent the sides of my cupboard, and B the front. Hinged to the side A is the swinging flour-chest $c$, fitting into a recess in the said side. The front of the cupboard is provided with doors $d\ e\ f$, opening, respectively, into the cupboard, tinware, and spice department, and the closet for holding the ironware. The door $e$ is hinged at its bottom, and, when lowered, rests upon the ledge $a$ and forms the kitchen-table. To the side A' is hinged the sink C, which is supported, when lowered, as shown in Fig. 1, by the jointed arm $g$. To this sink is attached a waste-pipe, $h$, through which, when the sink is raised, the water is discharged into the waste-pipe $b$, leading to a water-receptacle, $m$, as shown in Fig. 2. This sink, when raised, enters a recess flush with the sides of the cupboard, and it is then secured by the button $n$ when not in use.

It will readily be seen that my cupboard is of great utility and convenience, as it will save a great amount of labor, as all the articles will be close at hand and out of sight. It is also, in its compactness, quite an ornament to a kitchen.

Having thus described my invention, what I claim as new, and desire to secure by Letters Patent, is—

A kitchen-cupboard, constructed as described, and consisting of the sides A A, front B, provided with the falling hinged door $e$, the flour-receptacle $c$, and sink C, all combined to operate substantially as and for the purpose set forth.

MILTON H. HILL.

Witnesses:
 ELMER F. MORRIS,
 DANIEL BAXTER.